US008368754B2

(12) United States Patent
Flores et al.

(10) Patent No.: US 8,368,754 B2
(45) Date of Patent: Feb. 5, 2013

(54) VIDEO PATTERN RECOGNITION FOR AUTOMATING EMERGENCY SERVICE INCIDENT AWARENESS AND RESPONSE

(75) Inventors: Romelia H. Flores, Keller, TX (US); Charlet N. Givens, Dallas, TX (US); Hung T. Kwan, Grand Prairie, TX (US); Shiju Mathai, Carrollton, TX (US)

(73) Assignee: International Business Machines Corporation, Armonk, NY (US)

( * ) Notice: Subject to any disclaimer, the term of this patent is extended or adjusted under 35 U.S.C. 154(b) by 918 days.

(21) Appl. No.: 12/402,626

(22) Filed: Mar. 12, 2009

(65) Prior Publication Data

US 2010/0231714 A1    Sep. 16, 2010

(51) Int. Cl.
*H04N 7/18* (2006.01)
*G06K 9/00* (2006.01)
(52) U.S. Cl. .................................. 348/143; 382/181
(58) Field of Classification Search .............. 348/143
See application file for complete search history.

(56) References Cited

U.S. PATENT DOCUMENTS

| | | | |
|---|---|---|---|
| 6,970,183 B1* | 11/2005 | Monroe | 348/143 |
| 2003/0038877 A1* | 2/2003 | Pfefferseder et al. | 348/82 |
| 2005/0242944 A1* | 11/2005 | Bankert et al. | 340/531 |
| 2005/0271250 A1* | 12/2005 | Vallone et al. | 382/103 |
| 2006/0215024 A1 | 9/2006 | Coonce et al. | |
| 2008/0016366 A1* | 1/2008 | Monroe | 713/182 |
| 2008/0175356 A1 | 7/2008 | Seidberg et al. | |
| 2008/0214142 A1 | 9/2008 | Morin et al. | |
| 2008/0304641 A1 | 12/2008 | Rowe et al. | |
| 2008/0309761 A1 | 12/2008 | Kienzle et al. | |
| 2009/0022362 A1* | 1/2009 | Gagvani et al. | 382/100 |
| 2009/0288011 A1* | 11/2009 | Piran et al. | 715/720 |
| 2010/0123579 A1* | 5/2010 | Midkiff | 340/541 |

OTHER PUBLICATIONS

House, B.C, et al., "Economical Video Monitoring of Traffic," NASA Tech Briefs, vol. 10, No. 1, p. 61, Jun. 1, 2986.

* cited by examiner

*Primary Examiner* — Glenton B Burgess
*Assistant Examiner* — Angela Nguyen
(74) *Attorney, Agent, or Firm* — Patents on Demand P.A.; Brian K. Buchheit; Scott M. Garrett

(57) ABSTRACT

Video analysis capabilities can be integrated into an emergency response system and/or a video operations center (VOC) monitoring for emergency incidents. At least one computer program driven response action involving detecting patterns in video streams that comprise video of an incident can be performed. This response action can be directed to VOC personnel and/or to emergency response system personnel. Further, the response action can result in an automated responses to an emergency incident and/or to an alerting of humans monitoring video to focus on a particular video stream/incident. One such response action, which increases video capture activity at a geographic location of the incident, can occur responsive to a receipt of an emergency call by the emergency response system. Another response action can analyze at least one video stream of the geographic location and can automatically dispatch (in approximately real time) an emergency responder to the geographic location. Still another action can analyze the video stream of a geographic location, can determine a high likelihood of an emergency incident, and can provide an alert in a user interface of the emergency response system or a VOC. Video of the incident can also be provided in the user interface.

17 Claims, 4 Drawing Sheets

Emergency Call Scenario 310

1. Citizen initiates a 911 call to the citizen emergency call environment. For land lines and some cell phone lines, the call environment receives geospatial information regarding the location of the caller (citizen) placing the call.
2. A call taker in the call environment interacts with the citizen to determine if an emergency is occurring. For a clearly identified emergency situation, the call taker dispatches emergency personnel (via radio) as is done in common situations today and a call record is created. In addition, a high severity emergency alert record is created and the emergency information (emergency description, geospatial information, etc.) is sent to the Trigger Analysis Engine.
3. If the VOC Interface has registered to receive high emergency alerts, the Trigger Analysis Engine automatically triggers a flow to VOC Interface with emergency information to alert the VOC operator of the emergency for subsequent surveillance of the environment.
4. If the Emergency Interface has registered to receive high emergency alerts, the Trigger Analysis Engine automatically triggers a flow to Emergency Interface to alert emergency personnel of the situation for preparation for handling the emergency.

Emergency Video Scenario 320

1. Camera feeds from cameras which have been positioned in high crime areas in the city are being received by the Video Surveillance System for appropriate classification and storage.
2. The VOC Interface can be utilized by a Video Operator to view video in the Video Surveillance System in near real-time. The VOC Operator can position the VOC Interface to display information from the Video Surveillance System for one or more cameras (or specific geospatial areas). In addition, when the VOC Operator sees a suspicious activity in a particular geospatial area, the VOC Operator can utilize the Emergency Dispatch System to dispatch emergency personnel (via radio) as is done in common situations today. An alert record is created indicating a high severity emergency and the emergency information (emergency description, geospatial information, etc.) is sent to the Trigger Analysis Engine.
3. The VOC Operator will continue to monitor the emergency via the VOC Interface.
4. If the Emergency Interface has registered to receive high emergency alerts, the Trigger Analysis Engine automatically triggers a flow to Emergency Interface with emergency information to alert emergency personnel of the situation for preparation for handling the emergency.

Automated Video Surveillance Scenario 330

1. Camera feeds from cameras which have been positioned in high crime areas in the city are being received by Video Surveillance System for appropriate classification and storage.

2. The Video Analysis Rules and Patterns Engine is constantly scanning the video and performing pattern matching against the video patterns available. When the Video Analysis Rules and Patterns Engine determines a match for the suspicious activities, an alert is sent to the Trigger Analysis Engine for subsequent monitoring or dispatching of appropriate resources. An alert record is created indicating a high severity emergency and the emergency information (emergency description, geospatial information, etc.) is sent to the Trigger Analysis Engine.

3. If the VOC interface has registered to receive high emergency alerts, the Trigger Analysis Engine automatically triggers a flow to VOC interface with emergency information to alert the VOC Operator of the emergency for subsequent surveillance of the environment.

4. If the Emergency Interface has registered to receive high emergency alerts, the Trigger Analysis Engine automatically triggers a flow to Emergency Interface with emergency information to alert emergency personnel of the situation for preparation in handling the emergency.

VIDEO PATTERN RECOGNITION FOR AUTOMATING EMERGENCY SERVICE INCIDENT AWARENESS AND RESPONSE

BACKGROUND

The present invention relates to the field of automation and, more particularly, to video pattern recognition for automating emergency service incident awareness and response.

In emergency situations, first responders (e.g., emergency service personnel) can have a huge impact in many scenarios, especially in life threatening situations. As such, emergency services make every effort to minimize response time and maximize life saving opportunities. Currently deployed technologies aid emergency services, but emergency services can often be delayed in dispatching personnel due to human limitations. Normally, emergency service personnel are manually dispatched by operators who respond as quickly as possible in critical situations but unfortunately can often take too long to dispatch emergency personnel. This delay can be caused by a number of factors including the time required for operators to be provided with information during an emergency. For example, when a victim of a crime calls an emergency service (e.g., police), operators often attempt to determine the nature of the crime, the victim's location, if the victim has sustained injuries, and other pertinent details.

In areas with surveillance, cameras can be an invaluable tool in providing useful information during an emergency situation. Surveillance equipment (e.g., cameras) used in this manner often communicate video stream from cameras to a surveillance center (e.g., video operations center). In surveillance centers, security personnel must manually review the video stream and make best-case decisions based on information gathered from the stream. When an emergency situation occurs and emergency services are required, security personnel must, in some cases, manually communicate the relevant information to a dispatch operator. These manual actions can be unyieldingly time-consuming and can potentially result in loss of life due to increasing the time in which emergency services can take to respond.

Further, in some events, victims of emergency situations cannot readily reach emergency services. For instance, a victim of a crime can enter a state of shock resulting in loss of communication skills. In these instances, rapid response of emergency personnel is of absolute paramount. Without an effective means to contact emergency services lives can be lost, property loss can occur, and a myriad of endangerments that continually escalate with the passage of time can unfold.

BRIEF DESCRIPTION OF THE SEVERAL VIEWS OF THE DRAWINGS

FIG. 3 (including FIG. 3A and FIG. 3B) shows a schematic diagram illustrating a set of scenarios for automated emergency service incident awareness and response in accordance with an embodiment of the inventive arrangements disclosed herein.

DETAILED DESCRIPTION

Figure 1:
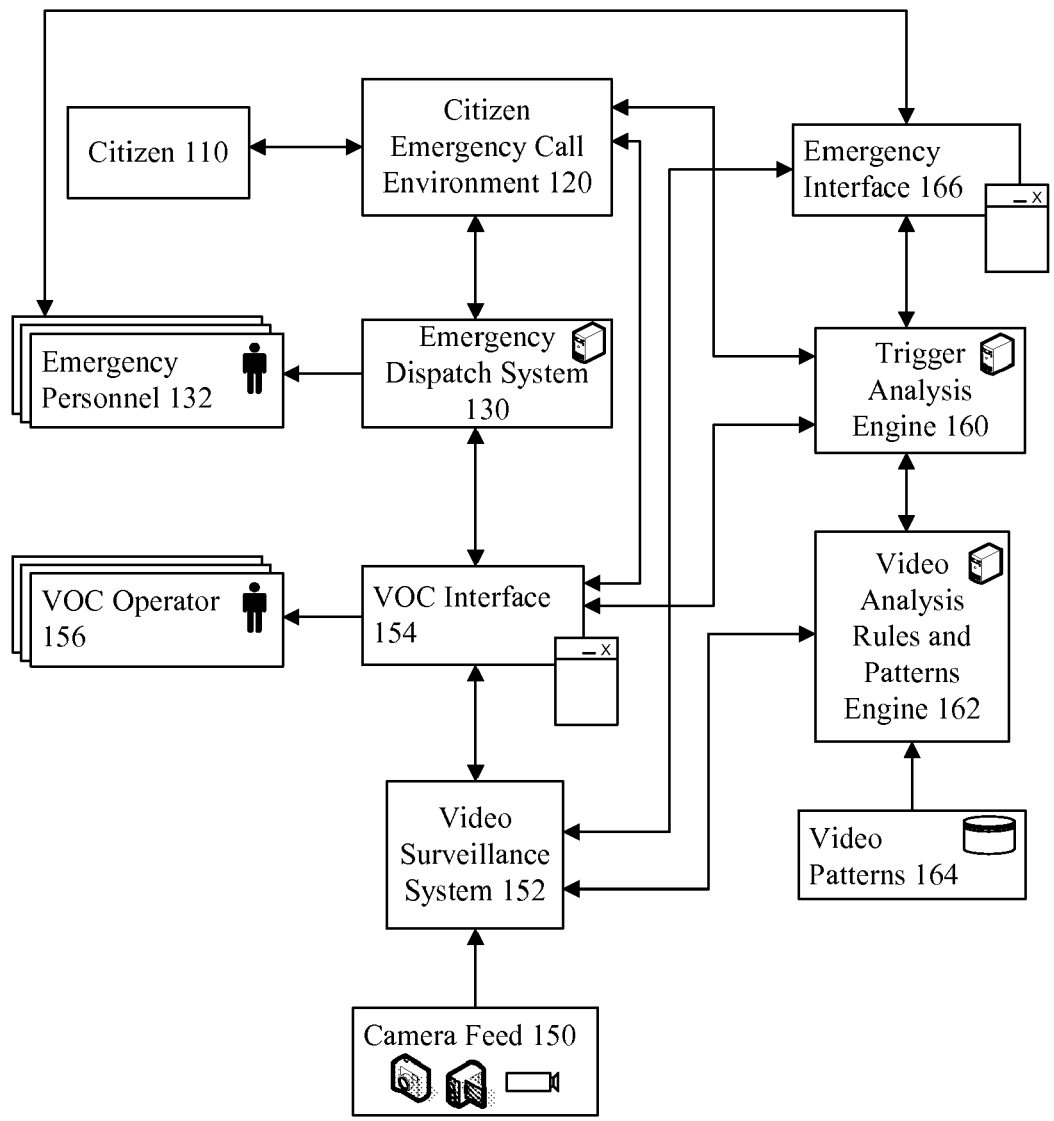
FIG. 1 is a schematic diagram illustrating a system for video pattern recognition for automating emergency service incident awareness and response in accordance with an embodiment of the inventive arrangements disclosed herein.

An embodiment of the present invention discloses a solution for video pattern recognition for automating emergency service incident awareness and response. In the solution, a video pattern recognition system can be integrated within an emergency response system. The integrated emergency response system can automate identifying potential emergency incidents using pattern recognition (e.g., video) and the dispatching the appropriate emergency personnel. In other words, situational factors programmatically determined from video pattern recognitions can fire programmatic events, which affect a computing environment of an emergency response center and/or a video operations center (VOC). The VOC can refer to a center that monitors video gathered from surveillance systems (e.g., digital video cameras). This monitoring has traditionally been performed by human agents who manually scan video feeds (which often are positioned to monitor high crime areas) obtained from the cameras, where human detected incidents are then conveyed to an emergency response center.

In one implementation, human emergency response workers and/or VOC personnel can be apprised of a potential situation (e.g., notified) based upon an incident determined from video pattern recognition. When this notification occurs, a computing interface of a human agent (of an emergency response center and/or VOC) can be adjusted to include a set of suggested incident responses tailored for the situation. In one embodiment, automated actions, such as automatically dispatching an emergency response unit to a scene can be triggered based upon video pattern recognition results. In one embodiment, an alert can be presented to a VOC agent to focus their attention on a potential incident, to provide additional information within a user interface discerned from pattern matching and data automatically derived from pattern matching results, to increase surveillance coverage of a geographic region associated with the potential incident, and the like. Appreciably, use of pattern matching to alert VOC agents of potential incidents can result in increasing efficient use of VOC human staff.

Further, in one embodiment, video pattern recognition can occur during an incident, which is conveyed through the emergency response center to on-site responders as well as to emergency response center and VOC agents. This can provide additional information to assist the on-site responders (i.e., based upon analyzed video from camera feeds from a burning building, responders can be told that at least X number of people are trapped in a specific room that is likely to be compromised by the fire within Y minutes).

In one embodiment, the system can continually be automatically updated from recorded incidents (e.g., call records) and correlating video surveillance records. Thus, a training or feedback loop can be instituted to improve response system performance with use. Further, in one embodiment, new incident patterns can be dynamically added to the system as incidents are reported and confirmed by observers and/or other surveillance equipment, allowing the system to rapidly adapt with minimal manual upkeep.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Any combination of one or more computer usable or computer readable medium(s) may be utilized. The computer-usable, computer-readable medium, or computer readable storage medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable, computer-readable medium, or computer readable storage medium may be any medium that can contain, store, the program for use by or in connection with the instruction execution system, apparatus, or device.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 for video pattern recognition for automating emergency service incident awareness and response in accordance with an embodiment of the inventive arrangements disclosed herein. In system 100, a video pattern recognition system can be coupled with an emergency response environment to facilitate automated incident identification, notification, and emergency services dispatching. As such, system 100 can eliminate the requirement of manually monitoring video feeds and reduce overhead cost of emergency response systems. Further, synergetic effects can result from integrating video pattern recognition with other emergency response systems. For example, incoming calls for incidents can be combined with video analysis results to determine a likelihood and severity of an incident occurrence, which has a greater accuracy than use of video analysis results and/or incoming call input alone. In another synergetic example, video sources (possibly including ones carried by responders) proximate to an incident can be automatically analyzed during an incident to provide on-site responders with valuable information to aid their emergency response efforts.

In system 100, components 160-166 can leverage existing surveillance equipment to identify emergency incidents occurring at the surveilled location. Identified emergency incidents and relevant information can be conveyed to entities 120, 130, 132, 152. Based on defined rules within engine 162, engine 162 can determine patterns which match emergency incidents and emergency personnel 132 can be automatically notified and/or dispatched to the incident location. For instance, if engine 162 identifies a burglary in progress at a retail store from camera feed 150, a notification immediately conveyed to the emergency interface 166 can alert proximate emergency personnel 132 about the burglary.

As used herein, emergency personnel 132 can include one or more workers associated with emergency services which can be respond to an emergency incident. Personnel 132 can include, but is not limited to, law enforcement officers, healthcare workers, fire safety personnel, and the like. Personnel 132 can interact with emergency equipment such as emergency response vehicles (e.g., ambulances), emergency communication devices, and the like.

Citizen 110 can be a human agent utilizing a communication medium to convey incident occurrence and information to a citizen emergency call environment 120. For instance, a citizen 110 can use a mobile phone to report a crime taking place at a residence. Communication mechanisms can include, voice calls over land lines and/or mobile phone, text exchange communication, and the like. Citizen emergency call environment 120 can be one or more systems utilized to interface with a citizen 110 and an emergency dispatch system 130. Environment 120 can include one or more telephony systems, wireless radio systems, and the like. Environment 120 can be used to dispatch resources to an emergency situation via communication with dispatch system 130.

Camera feed 150 can include one or more media streams obtained from surveillance equipment. Camera feed 150 can include audio/video streams, digital still images, thermographic data, motion sensors, and the like. In one embodiment, camera feed 150 can include surveillance video obtained from surveillance cameras positioned in public areas and/or private areas. For instance, camera feed 150 can include traffic cameras installed by a city to deter speeding.

Emergency dispatch system 130 can be one or more communication and management components for handling emergency resource personnel dispatching. In one embodiment, system 130 can include a wireless radio system (e.g., ultra high frequency radio) permitting real-time communication with emergency personnel 132. System can allow direct and real-time communication with call environment 130 and/or video operations center (VOC) operator 156.

In one embodiment, system 100 can take advantage of incident reports from citizen 110 to an emergency call environment 120. In the embodiment, citizen 110 report of an incident can cause environment 120 to create a call record for the incident. The call record can include one or more uniquely identifying information which can be used to automatically commence surveillance. For example, when a citizen reports an automobile theft at a shopping mall, call record information can be used by system 100 to begin real-time video surveillance of the area of the shopping mall.

Various alert notifications can be generated based on engine 162 configuration in response to emergency incident occurrence identified in feed 150. Notifications can include relevant emergency incident information which can be conveyed to one or more components of system 100. For example, details about a stolen car (e.g., model, license plate) obtained from the analysis of the feed 150 by engine 162 can be automatically conveyed to personnel 132. Information utilized to facilitate the automated integration of components can include text information, audio/video media streams, digital documents, and the like. Information can include timing information, geospatial information, incident activity information, incident severity information, currently dispatched emergency response personnel, and the like. In one instance, Computer Vision Markup Language (CVML) can be extended to include, but is not limited to, the additional attributes or tags that may be required for seamless exchange of alert notification, alert severity, priority, automated or human intervention alert, GPS coordinates, pattern recognition, and emergency information.

System 100 can support an arbitrary level of alert classification and notification limited only by system 100 configuration. In one embodiment, notifications can have three levels of severity, high, medium, and low, where each severity can be communicated differently based on engine 160 configuration. For instance, if a sharp object such as a knife is determined in feed 150, a high alert notification can be generated and immediately communicated to personnel 132.

Video analysis rules and patterns engine 162 perform pattern matching using patterns 164 to determine incident occurrence in video surveillance obtained from system 152. Based on video patterns 164, an incident in feed 150 can be identified by engine 162. When a pattern match occurs, rules within engine 162 can trigger an alert notification to be automatically generated. Rules can include, but are not limited to, pre-determined rules, user established rules, learned rules, a priori rules, and the like. Alert notification can be communicated to engine 160 which can perform appropriate notification actions. Engine 162 can utilize public or proprietary pattern recognition algorithms for detecting incident occurrence and progress. Further, engine 164 can utilize technologies including facial detection/recognition, object tracking, pedestrian detection, license plate recognition, vehicle tracking, and the like to automatically determine incident activity. In one embodiment, engine 162 can be a surveillance engine able to utilize customized analytics and video pattern recognition. In one instance, engine 162 can perform prediction analysis on feed 150 to determine potential emergency incidents.

Trigger analysis engine 160 can provide alert notification management and distribution necessary for transparently and seamlessly integrating components in system 100. Alert notifications received by engine 160 can be communicated to one or more multiple systems associated with engine 160. For example, when a high severity alert notification is received, emergency dispatch system 130 and interface 154 can be notified of the alert. Components/systems can register presence and/or parameters information with engine 160, which can be performed automatically or manually. In this manner, heterogeneous components can communicate together with minimal configuration changes. Engine 160 can utilize registered presence/parameter information to determine relevant alert notifications for each entity registered. Alert notification priority can be controlled based on system priority. For example, engine 162 detected incidents can generate an alert notification with a low alert and priority can be automatically increased when an operator 156 manually confirms the incident. Further, engine 160 can utilize GPS information and/or camera positioning information to facilitate additional automated surveillance to be conducted.

Emergency interface 166 can be one or more user interface elements able to present emergency incident information to personnel 132, call environment 120, and system 130. In one embodiment, interface 166 can be a user interface which can present alert notifications of emergency incidents automatically determined by engine 162. For instance, interface 166 can alert on-scene personnel 132 of a potential fire hazard when determined by engine 162 from scene video feed 150. Further, interface 166 can aid in resource management which can display dispatch information such as currently dispatched personnel, geospatial information, presence information, and the like. In one instance, interface 166 can permit personnel 132 to communicate incident information to environment 120, system 130, operator 150, and other relevant personnel.

In one embodiment, interface 166 can present real-time emergency incident information to emergency personnel. Interface 166 can be integrated with mobile platforms such as vehicles, mobile devices, and the like. For example, interface 166 can be an emergency information display kiosk positioned on a control panel of a ship to prepare emergency personnel during transit to an incident. Further, interface 166 can utilize real-time information (e.g., global positioning system information) to present presence information during search and rescue operations to aid emergency personnel in locating persons.

VOC interface 154 can permit operator 156 to interact with system 152 to perform relevant surveillance actions. For instance, interface 154 can allow operator 156 to retrieve stored video surveillance appropriate to emergency incidents. Interface 154 can enable operator 156 to forward automatically generated alert notifications to interface 166 which can be presented to system 130, environment 120, and personnel 132. Additionally, interface 154 can enable operators to manually verify and/or correct pattern recognition performed by engine 162. As such, system 100 can rapidly learn from historic incidents and adapt to correctly respond to new incidents.

VOC operator 156 can be personnel monitoring feed 150 and interacting with system 152 and interface 154. VOC operator 156 can respond to automated alerts presented in interface 154 generated by engine 162. VOC operator 156 can determine emergency incidents and dispatch appropriate personnel which can automatically generate an alert notification. Notification can be communicated automatically to emergency interface 166 for effective dispatch of personnel and incident response.

Video surveillance system 152 can be one or more hardware/software components utilized in receiving, processing, storing, and presenting surveillance information. System 152 can communicate with components 162, 166 to enable automated emergency incident identification and response. Feed 150 can be automatically conveyed to engine 162 for processing which can yield alert notifications when pattern matches are found. System 152 can automatically assist operator 156 with monitoring a geospatial area and/or incident area. In one instance, system 152 can automatically obtain additional information from on-site equipment, such as smoke detectors, burglar alarm sensors, and the like.

In one embodiment, system 152 can be part of a middleware solution that provides video analytics given video feeds. In the embodiment, system 152 can automate surveillance activities in response to emergency incident conditions and/or incident discovery. For instance, when an incident is determined by engine 162 from feed 150, system 152 can automatically control (e.g., pan/tilt/zoom) proximate cameras to obtain additional information about the incident.

Video patterns 164 can be a library (e.g., data store) able to store pattern information for efficient scanning of video obtained from feed 150. Pattern information can include video data, statistical data, information from feature extraction algorithms, and the like. Patterns 164 can be continually updated based on engine 162 input and information gathered from environment 120 and system 152. Patterns 164 can be automatically or manually updated and/or adjusted based on system 100 performance requirements.

As used herein, real-time can include near real-time communication and notification. System 100 communications can occur over one or more wireless and/or wired technologies including, but not limited to virtual private networks (VPN), internets, intranets, emergency networks, and the like. Security mechanisms can be implemented to allow information to be safely and securely exchanged throughout system 100. System 100 can utilize one or more security technologies including but not limited to, encryption, voice recognition/identification, security tokens, and the like.

Drawings shown herein are for illustrative purposes only and should not be construed to limit the invention in any regard. Interfaces 154, 166 can be a component of a shared interface system which can present appropriate information to authorized personnel. Interface 166 can be customized based on emergency services needs and/or requirements enabling rapid and easy interaction with system 100 components. Interfaces 154, 166 can include, but are not limited to, graphical user interface (GUI), voice user interface (VUI), text exchange interface, multi-modal interface, and the like.

Figure 2:
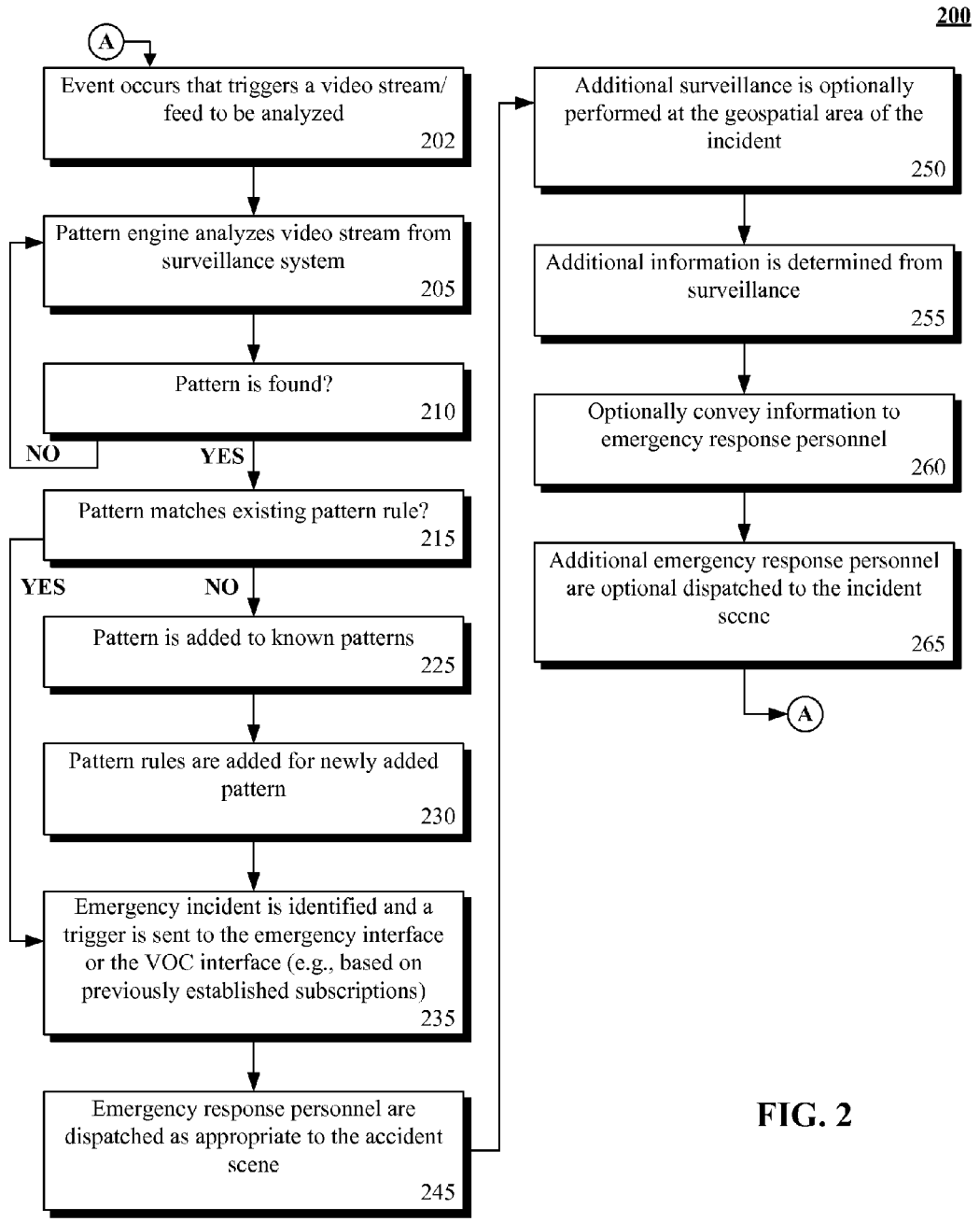
FIG. 2 is a flowchart illustrating a method for automating emergency service incident awareness and response in accordance with an embodiment of the inventive arrangements disclosed herein.

FIG. 2 is a flowchart illustrating a method 200 for automating emergency service incident awareness and response in accordance with an embodiment of the inventive arrangements disclosed herein. Method 200 can be performed in the context of system 100. In method 200, a video pattern recognition system can be integrated within an emergency response system and/or a VOC to increase the efficiency and handling of emergency situations. Method 200 can be performed continuously during an active emergency response system to enable end-to-end automation to be performed transparently. In the method 200, a video pattern recognition system can assist personnel in reducing workload and increasing response time by automating incident detection, surveillance, and response.

Method 200 can begin in step 202, where an event can occur that triggers a video stream or feed to be analyzed. Step 202 can be significant because a vast quantity of video streams may be monitored and fully analyzing each stream may be resource wasteful or resource prohibitive (or impractical given a need for real-time or near real-time video analytics). In one embodiment, a light-weight or rudimentary processing of video can occur, which can trigger further or more complete video stream analysis. The triggering event may be tied to receipt of a call center incident report, a VOC incident report, camera feed automatic recognition (e.g., rudimentary light-weight analytics), input from other sensors (e.g., detection of a sound of breaking glass, a motion sensor detecting motion, an entrance way sensor detecting a breech, etc.).

In step 205, a pattern engine can analyze video streams from one or more surveillance systems or other video sources. Streams can include data from audio/video streams, images, and the like. Multiple streams can be processed in parallel causing method 200 to be performed concurrently for each stream being analyzed. In step 210, if a pattern is found the method can continue to step 215, else return to step 205 where the stream can continue to be analyzed for a predetermined period before process state returns to step 202 (requiring another trigger to cause a specific video stream to be analyzed in depth). In step 215, if a pattern matches an existing pattern rule, the method can proceed to step 235, else continue to step 225.

In step 225, the found pattern can be added to known patterns in a pattern library. In step 230, pattern rules for the newly added pattern can be established based on one or more parameters including, but not limited to, call record information, system rules, heuristically determined rules, and the like.

In step 235, the emergency incident can be identified and a trigger can be sent to an emergency response system interface and/or a VOC interface. Where the triggers are sent can be based upon previously established subscriptions (e.g., subscriptions handled by the trigger analysis engine 160). Identification can include standard conventions for classifying emergency situations including, but not limited to, criminal activities (e.g., assault), search and rescue, fire rescue, and the like. Further, information about the identified incident can be conveyed to subscribers (e.g., emergency response system personnel, VOC personnel, dispatched emergency responders, etc.) and presented in the related interfaces.

In optional step 245, emergency response personnel can be automatically dispatched to the incident scene. In step 250, additional surveillance can be optionally performed at the geospatial area of the incident. In step 255, additional information can be determined from surveillance. Additional surveillance can include public/private video cameras, mobile phones, and the like. In step 260, information gained from additional surveillance can be optionally conveyed to emergency response personnel and/or VOC personnel. In step 265, additional emergency response personnel can be optionally dispatched to the incident scene.

The method 200 of FIG. 2 is an example of a possible process flow, which is not meant to be illustrative and not exhaustive. Various other flows can occur and be considered within scope of the present disclosure. The scenarios 310-330 are examples of a few of these additional flows.

In regard to the contemplated process flows, it should be noted that the level of integration of the video analytics and the emergency response center and/or VOC can vary from implementation to implementation. In some embodiments, video analysis results can trigger automated responses and processes (e.g., automatic dispatch of response personnel, for instance). In other embodiments, video analysis results can complement a largely manual monitoring system. For example, human agents (such as at a VOC) can be provided with additional information resulting from video analysis and/or can be focused upon a specific video footage believed to be significant. The additional information presented to emergency response system or VOC personnel can indicate, for example, a priority status of an incident (which can dynamically change during the course of an incident), a suggested number and type of responders, a need for additional responders as an incident unfolds, specifics relating to entities appearing video based upon video analytics (e.g., perpetrator (s) name and related information, responder identity, threats on scene, etc.), and other such useful information. In one embodiment, the video analytics can be used to create automated and/or semi-automated logs, which are indexed against incident, responder, perpetrator, incident location, etc.

That is, FIG. 3 (including FIG. 3A and FIG. 3B) is a schematic diagram illustrating a set of scenarios 310-330 for automated emergency service incident awareness and response in accordance with an embodiment of the inventive arrangements disclosed herein. Scenarios 310-330 can be performed in the context of system 100.

In scenarios 310-330, a video pattern recognition system integrated within an emergency response system can improve response time and emergency response personnel preparedness. Existing emergency response services can be enhanced without significant changes to currently deployed systems. The scenarios 310-330 illustrate contemplated high level flows of system 100 for each scenario.

In scenario 310, a citizen can initiate a call to a citizen emergency call environment (e.g., 911 service). For some landlines and mobile phones, the call environment can receive geospatial information regarding the location of the caller. The geospatial information can be used to direct a video operation center (VOC) operator can position cameras for additional surveillance. For example, a mapping of the caller geospatial coordinates to VOC camera coordinates can be performed to determine the appropriate camera(s) to use. This mapping (e.g., transformation) can be performed by the trigger analysis engine 160.

An operator within the emergency call environment can interact with the citizen to determine if an emergency is occurring. For a clearly identified emergency situation, the operator can dispatch emergency personnel (e.g., via radio) as is common in existing services. A call record can be created for the identified emergency. A high severity emergency alert notification (e.g., alert record) can be created automatically by system 100, in which the emergency information is sent to the trigger analysis engine 160. The trigger analysis engine 160 can subsequently forward the alert to systems which have registered to receive particular alerts.

If the VOC interface 154 is registered to receive high emergency alerts, the trigger analysis engine can automatically trigger a flow to the VOC interface 154 with emergency information. The information can be presented to the VOC operator 156 which can be used to perform surveillance of the environment where the emergency is occurring. Operator 156 can utilize dispatch system 130 to provide additional updates to appropriate entities within system 100. In one embodiment, the VOC interface 154 can automatically present the area (e.g., real-time video feed) in which the emergency is occurring to a VOC operator 156. Alternatively, interface 154 can present an alert dialog indicating an emergency is occurring and require operator interaction before presenting relevant emergency information.

If the emergency interface 166 is registered to receive high emergency alerts, the trigger analysis engine 160 can automatically trigger a flow to the emergency interface 166. The interface 166 can present emergency information to personnel 132 which can aid personnel 132 in preparing and handling the emergency situation. For example, interface 166 can be placed within the rear compartment of an ambulance, allowing emergency personnel to view important information about an emergency situation such as the data or video content of the situation.

In scenario 320, camera feeds 150 from cameras positioned in high crime areas within a city can be received by video surveillance system 152 for appropriate classification and storage. The VOC interface 154 can be utilized by an operator to view video from the surveillance system 152 in real-time or near real-time. The VOC operator can utilize the interface 154 to display information from the surveillance system 152 for one or more cameras and/or specific geospatial areas. Additionally, when the operator notices suspicious activity in a particular geospatial area, the operator can utilize the emergency dispatch system 130 to dispatch emergency personnel (e.g., via radio), as is common in existing services. An alert notification (e.g., alert record) can be automatically created indicating a high severity emergency and the emergency information can be communicated to trigger analysis engine 160. The creation of the alert notification can be performed as a result of the integration of various systems via the trigger analysis engine 160. As such, the addition of this capability ensures that systems which have registered for specific types of alerts can be alerted when the alerts are generated.

The operator can continue to monitor the emergency via the interface 154, which can present relevant emergency information including emergency type, geospatial information, video feeds, and the like.

If the emergency interface 166 is registered to receive high emergency alerts, the trigger analysis engine can automatically trigger a flow to the emergency interface 166. The interface 166 can present emergency information to alert personnel 132 of the emergency situation and can prepare personnel 132 for handling of the emergency.

In scenario 330, camera feeds 150 from cameras positioned in high crime areas within a city can be received by video surveillance system 152 for appropriate classification and storage. Video analysis rules and patterns engine 162 can constantly scan video and perform pattern matching against the video patterns available. When new patterns are determined, the new patterns can aid in the building of the pattern library and detection of patterns in video can enable a more automated environment. When the engine 162 determines a match for an emergency, an alert can be communicated to the trigger analysis engine 160. Engine 160 can respond by automatically dispatching appropriate resources (e.g., personnel 132) and provide subsequent monitoring of the emergency. An alert notification (e.g., alert record) can be automatically created indicating a high severity emergency and emergency information can be communicated to the trigger analysis engine 160.

If the interface 154 is registered to receive high emergency alerts, the trigger analysis engine 160 can automatically trigger a flow to interface 154. The interface 154 can present emergency information to alert operator 156 of the emergency and appropriate actions can be performed by the operator 156.

If the interface 166 is registered to receive high emergency alerts, the trigger analysis engine 160 can automatically trigger a flow to interface 166. The interface 166 can present relevant emergency information to emergency personnel 132 which can aid personnel 132 in responding and preparing to the emergency. As emergency situations change, alert priorities can be changed in real-time. Further, operator 154 monitoring the emergency area can respond in real-time to ensure additional alerts are communicated to personnel 132. In one embodiment, facial recognition can be combined with system 100 to automatically identify persons at an emergency area. In the embodiment, a criminal history and/or criminal watch database can be used to determine a relevant match and update the severity and priority based on the match.

Scenarios 310-330 are for illustrative purposes only and should not be construed to limit the invention. Operational flows described in the scenarios 310-330 illustrate contemplated functionality and implementation details can vary when deployed in real world scenarios.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An emergency response method comprising:
   integrating video analysis capabilities into at least one of an emergency response system and a video operations center (VOC) monitoring for emergency incidents; and
   performing at least one computer program driven response action involving detecting patterns in video streams that comprise video of an incident, wherein the response action comprises:
   analyzing at least one video stream of a geographic location and automatically dispatching an emergency responder to the geographic location based upon results of analyzing the at least one video stream, wherein the analyzing and the automatic dispatching occur in at least one of real-time and near real-time;
   aggregating results of analyzing the at least one video stream of the geographic location with data input into the emergency response system based upon real-time voice communications involving emergency response system personnel;
   determining a likelihood of an emergency incident based upon the aggregated results of analyzing the video stream and the data input based upon real time voice communications; and
   automatically dispatching the emergency responder only when the determined likelihood of the emergency incident exceeds a previously established threshold.

2. The method of claim 1, further comprising:
   equipping responders with at least a video capture device and a video display device that are communicatively linked to at least one of the emergency response system and the video operations center (VOC), wherein video from said video capture device is routed to at least one of the emergency response system and the video operations center (VOC) where the routed video is programmatically analyzed for patterns detection purposes, and wherein video from at least one of the emergency response system and video operations center (VOC) is selectively presented upon the video display device.

3. The method of claim 1, wherein the video analysis engine is configured to recognize patterns in video streams, to compare these patterns against a data store of previously established patterns that are associated with defined incidents to determine occurrences of instances depicted in the video stream, and wherein the emergency response system is configured to dispatch emergency personnel to a site of an incident in response to an occurrence of an incident, and is configured to receive emergency calls alerting personnel of an emergency requiring a dispatch of emergency personnel.

4. The method of claim 1, further comprising:
   granting control of at least one video source proximate to the geographic location to at least one of the emergency response system and the video operations center (VOC), wherein the control permits adjustments to be remotely made to the video source, which alter a video stream acquired from the video source, said altered video stream being routed to at least one of the emergency response system and the video operations center (VOC), whereby control comprises one of video source angle, video source focal point, video source contrast, and zoom.

5. The method of claim 1, further comprising dynamically adjusting video coverage during the incident in real-time based upon results of pattern detection to ensure a maximization of video related to the incident is captured and available to at least one of the emergency response system and the video operations center (VOC), wherein the pattern detection from the video analysis in conjunction with an ability to control video captured by remotely located video sources proximate to the geographic location ensures that important entities, which are identified based upon the video analysis, and that are involved in the incident are tracked by video routed to at least one of the emergency response system and the video operations center (VOC).

6. A computer program product for emergency response comprising a non-transitory computer readable storage medium that is a physical storage medium having computer usable program code embodied therewith, said computer usable program code being configured to be utilized by a processor, the computer program product comprising:
   computer usable program code configured to integrate video analysis capabilities into at least one of an emergency response system and a video operations center (VOC) monitoring for emergency incidents; and
   computer usable program code configured to perform at least one computer program driven response action involving detecting patterns in video streams that comprise video of an incident, wherein the response action comprises:
   analyzing at least one video stream of a geographic location and automatically dispatching an emergency responder to the geographic location based upon results of analyzing the at least one video stream, wherein the analyzing and automatic dispatching occur in at least one of real-time and near real-time;

aggregating results of analyzing the at least one video stream of the geographic location with data input into the emergency response system based upon real-time voice communications involving emergency response system personnel;

determining a likelihood of an emergency incident based upon the aggregated results of analyzing the video stream and the data input based upon real time voice communications; and automatically dispatching the emergency responder only when the determined likelihood of the emergency incident exceeds a previously established threshold.

7. The computer program product of claim 6, wherein the video analysis engine is configured to recognize patterns in video streams, to compare these patterns against a data store of previously established patterns that are associated with defined incidents to determine occurrences of instances depicted in the video stream, and wherein the emergency response system is configured to dispatch emergency personnel to a site of an incident in response to an occurrence of an incident, and is configured to receive emergency calls alerting personnel of an emergency requiring a dispatch of emergency personnel.

8. The computer program product of claim 6, wherein responders are equipped with at least a video capture device and a video display device that are communicatively linked to at least one of the emergency response system and the video operations center (VOC), further comprising:

computer usable program code configured to route video from said video capture device to at least one of the emergency response system and the video operations center (VOC) where the routed video is programmatically analyzed for patterns detection purposes, and wherein video from at least one of the emergency response system and video operations center (VOC) is selectively presented upon the video display device.

9. The computer program product of claim 6, wherein the video analysis engine is configured to recognize patterns in video streams, to compare these patterns against a data store of previously established patterns that are associated with defined incidents to determine occurrences of instances depicted in the video stream, and wherein the emergency response system is configured to dispatch emergency personnel to a site of an incident in response to an occurrence of an incident, and is configured to receive emergency calls alerting personnel of an emergency requiring a dispatch of emergency personnel.

10. The computer program product of claim 6, further comprising:

computer usable program code configured to grant control of at least one video source proximate to the geographic location to at least one of the emergency response system and the video operations center (VOC), wherein the control permits adjustments to be remotely made to the video source, which alter a video stream acquired from the video source, said altered video stream being routed to at least one of the emergency response system and the video operations center (VOC), whereby control comprises one of video source angle, video source focal point, video source contrast, and zoom.

11. The computer program product of claim 6, further comprising:

computer usable program code configured to dynamically adjust video coverage during the incident in real-time based upon results of pattern detection to ensure a maximization of video related to the incident is captured and available to at least one of the emergency response system and the video operations center (VOC), wherein the pattern detection from the video analysis in conjunction with an ability to control video captured by remotely located video sources proximate to the geographic location ensures that important entities, which are identified based upon the video analysis, and that are involved in the incident are tracked by video routed to at least one of the emergency response system and the video operations center (VOC).

12. A system for emergency response comprising:

one or more one processors; and a non-transitory computer readable storage medium that is a physical storage medium having computer usable program code embodied therewith, said computer usable program code being configured to be utilized by at least one of the one or more processors, the computer program product comprising:

computer usable program code configured to integrate video analysis capabilities into at least one of an emergency response system and a video operations center (VOC) monitoring for emergency incidents; and computer usable program code configured to perform at least one computer program driven response action involving detecting patterns in video streams that comprise video of an incident, wherein the response action comprises:

analyzing at least one video stream of a geographic location and automatically dispatching an emergency responder to the geographic location based upon results of analyzing the at least one video stream, wherein the analyzing and automatic dispatching occur in at least one of real-time and near real-time;

aggregating results of analyzing the at least one video stream of the geographic location with data input into the emergency response system based upon real-time voice communications involving emergency response system personnel;

determining a likelihood of an emergency incident based upon the aggregated results of analyzing the video stream and the data input based upon real time voice communications; and automatically dispatching the emergency responder only when the determined likelihood of the emergency incident exceeds a previously established threshold.

13. The system of claim 12, wherein the video analysis engine is configured to recognize patterns in video streams, to compare these patterns against a data store of previously established patterns that are associated with defined incidents to determine occurrences of instances depicted in the video stream, and wherein the emergency response system is configured to dispatch emergency personnel to a site of an incident in response to an occurrence of an incident, and is configured to receive emergency calls alerting personnel of an emergency requiring a dispatch of emergency personnel.

14. The system of claim 12, wherein responders are equipped with at least a video capture device and a video display device that are communicatively linked to at least one of the emergency response system and the video operations center (VOC), further comprising:

computer usable program code configured to route video from said video capture device to at least one of the emergency response system and the video operations center (VOC) where the routed video is programmatically analyzed for patterns detection purposes, and wherein video from at least one of the emergency response system and video operations center (VOC) is selectively presented upon the video display device.

15. The system of claim 12, wherein the video analysis engine is configured to recognize patterns in video streams, to compare these patterns against a data store of previously established patterns that are associated with defined incidents to determine occurrences of instances depicted in the video stream, and wherein the emergency response system is configured to dispatch emergency personnel to a site of an incident in response to an occurrence of an incident, and is configured to receive emergency calls alerting personnel of an emergency requiring a dispatch of emergency personnel.

16. The system of claim 12, further comprising:
computer usable program code configured to grant control of at least one video source proximate to the geographic location to at least one of the emergency response system and the video operations center (VOC), wherein the control permits adjustments to be remotely made to the video source, which alter a video stream acquired from the video source, said altered video stream being routed to at least one of the emergency response system and the video operations center (VOC), whereby control comprises one of video source angle, video source focal point, video source contrast, and zoom.

17. The system of claim 12, further comprising:
computer usable program code configured to dynamically adjust video coverage during the incident in real-time based upon results of pattern detection to ensure a maximization of video related to the incident is captured and available to at least one of the emergency response system and the video operations center (VOC), wherein the pattern detection from the video analysis in conjunction with an ability to control video captured by remotely located video sources proximate to the geographic location ensures that important entities, which are identified based upon the video analysis, and that are involved in the incident are tracked by video routed to at least one of the emergency response system and the video operations center (VOC).

* * * * *